(No Model.) 7 Sheets—Sheet 1.

R. B. H. LEIGHTON.
LENS GRINDING MACHINE.

No. 441,570. Patented Nov. 25, 1890.

WITNESSES:
Paul Johst
C. Sedgwick

INVENTOR:
R. B. H. Leighton

BY
Munn & Co.
ATTORNEYS

(No Model.) 7 Sheets—Sheet 3.

R. B. H. LEIGHTON.
LENS GRINDING MACHINE.

No. 441,570. Patented Nov. 25, 1890.

WITNESSES:
Paul Johst
C. Sedgwick

INVENTOR:
R. B. H. Leighton
BY Munn & Co.
ATTORNEYS (No Model.) 7 Sheets—Sheet 4.
R. B. H. LEIGHTON.
LENS GRINDING MACHINE.

No. 441,570. Patented Nov. 25, 1890.

WITNESSES:
Paul Johst
E. Sedgwick

INVENTOR:
R. B. H. Leighton
BY
Munn & Co
ATTORNEYS (No Model.) 7 Sheets—Sheet 5.

R. B. H. LEIGHTON.
LENS GRINDING MACHINE.

No. 441,570. Patented Nov. 25, 1890.

WITNESSES:
Paul Johot
C. Sedgwick

INVENTOR:
R. B. H. Leighton
BY Munn & Co.
ATTORNEYS

(No Model.) 7 Sheets—Sheet 6.

R. B. H. LEIGHTON.
LENS GRINDING MACHINE.

No. 441,570. Patented Nov. 25, 1890.

WITNESSES:
Paul Johot
C. Sedgwick

INVENTOR:
R. B. H. Leighton
BY
Munn & Co.
ATTORNEYS (No Model.) 7 Sheets—Sheet 7.

R. B. H. LEIGHTON.
LENS GRINDING MACHINE.

No. 441,570. Patented Nov. 25, 1890.

WITNESSES:
Paul Johst
C. Sedgwick

INVENTOR
R. B. H. Leighton
BY
Munn & Co
ATTORNEYS

UNITED STATES PATENT OFFICE.

RICHARD B. H. LEIGHTON, OF PHILADELPHIA, PENNSYLVANIA.

LENS-GRINDING MACHINE.

SPECIFICATION forming part of Letters Patent No. 441,570, dated November 25, 1890.

Application filed March 6, 1890. Serial No. 342,921. (No model.)

*To all whom it may concern:*

Be it known that I, RICHARD B. H. LEIGHTON, of Philadelphia, in the county of Philadelphia and State of Pennsylvania, have invented a new and Improved Lens-Grinding Machine, of which the following is a full, clear, and exact description.

My invention relates to improvements in lens-grinding machines.

It is well known that it is an extremely difficult matter to manufacture a perfect lens, and that long periods of time are consumed in the manufacture of the larger telescopic lenses, so that a large lens is only manufactured at great expense.

The object of my invention is to obviate this difficulty by providing a machine that will grind a lens of any reasonable size, that may be easily and accurately adjusted to the various-sized lenses, that will grind a perfectly-true lens, and that will be so arranged that the focus of the lens may be changed and regulated to a nicety.

To this end my invention consists in certain features of construction and combinations of parts, which will be hereinafter fully described, and specifically pointed out in the claims.

Reference is to be had to the accompanying drawings, forming a part of this specification, in which similar numerals of reference indicate corresponding parts in all the figures.

Fig. 20, a plan of the same; Fig. 21, a broken end view showing the manner in which the radial bar is fixed to the lens-carriage, and Fig. 22 a detail view of one of the blocks by which the radial bar is fastened to the lens-carriage.

Figure 1:
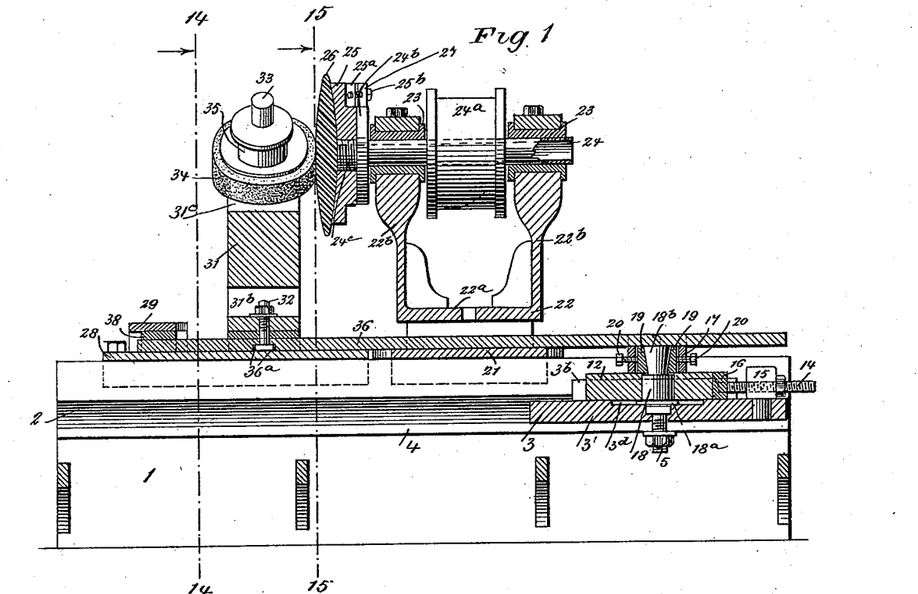
Figure 1 is a vertical longitudinal section showing the lens-carriage or head-block and the corresponding grinder on the line 1 1 in Fig. 2, the parts being arranged to grind a convex lens.
Figure 2:
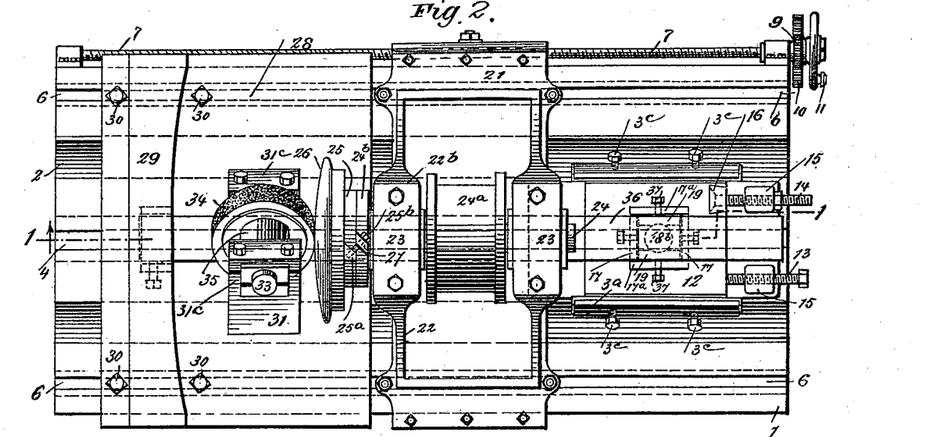
Fig. 2 is a plan view of the same.

The grinding and lens-carrying carriages are supported upon a substantial bed 1, which forms the base of the machine, said bed having a longitudinal recess 2, extending throughout its entire length, and which is large enough to allow the slide 3 to move therein, a slot 4 in the bottom of said recess, through which extends a bolt 5 of the slide, and by means of which the slide is fixed in the recess 2, a longitudinal T-slot 6 upon each side of the recess 2 and upon the upper flat surface of the bed, which affords means of bolting the various parts of the machine thereto, a feed-screw and rack 7 8, like that of an ordinary lathe, and suitable gear-wheels 9 10, provided with a handle 11, by which said feed-screw may be operated. The slide 3 is longitudinally movable in the recess 2 of the bed, and is fixed in a desired position therein by the bolt 5, as described.

Figures 16, 17, 18:
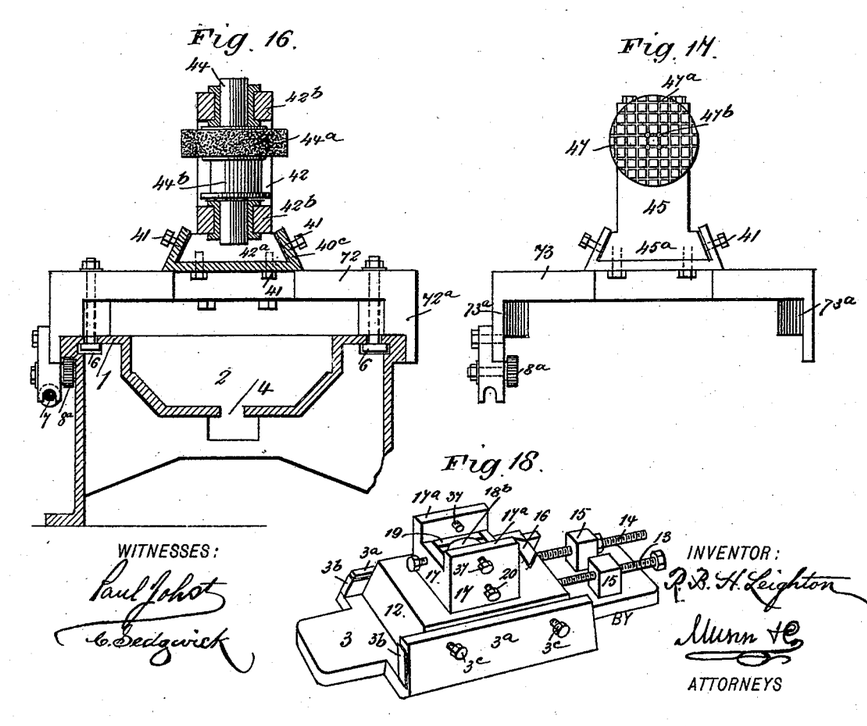
Fig. 16, a vertical cross-section on the line 16 16 of Fig. 12, looking in the direction of the arrow.
Fig. 17, a front elevation of the finishing-tool and carriage, taken from the line 17 17 in Fig. 13, but with the feed-screw and operating-gears removed from the carriage or stand.
Fig. 18, a detail perspective view of the chuck by which the radial bar is held and regulated.

The chuck has a base-plate 3, having inwardly-tapering flanged edges $3^a$ upon its upper side, each of said edges being provided upon its inner side with a slide $3^b$, which is adjusted by the set-screws $3^c$, so that the plate 12, having beveled edges, may fit nicely between said slides. The plate 12, which is longitudinally movable upon the base 3, is regulated by the screws 13 14, which are mounted in posts 15 on the base $3'$ in the rear of said plate, the screw 13 abutting directly with the plate 12, and the screw 14 being connected thereto by means of a nut 16, which is dovetailed into the rear end of the plate 12, so that the plate may be advanced by turning up the screws 13 and 14 and retracted by loosening the screw 13 and turning back the screw 14.

Upon the top of the plate 12 is the bar-holder 17, which is a rectangular frame having a flat base which turns upon the plate 12, and two opposite wide sides $17^a$, extending above the body of the frame to hold the radius-bar, as hereinafter described.

The bar-holder 17 is attached to the plate 12 by the bolt 18, which has a cylindrical body portion which turns in the plate 12, an annular flange $18^a$ upon the bottom, which overlaps the bottom of the plate 12, and is longitudinally movable in the slot $3^d$ in the upper part of the base $3'$, and an inverted-cone-shaped upper portion $18^b$, having its top surface about flush with the narrower sides of the bar-holder 17.

Between the sides of the bar-holder 17 and the tapering portion $18^b$ of the bolt 18 are the packing-pieces or abutments 19, which have concave inner recesses tapered oppositely to the portion $18^b$ of the bolt 18 to fit thereon, and are fixed in a desired position against the same by the set-screws 20, which project through the sides of the bar-holder 17 and impinge upon the back sides of the abutments. It will thus be seen that the bar-holder will turn upon a true center without variation, and its position may be approximately fixed by moving the base $3'$ in the recess 2, and may be nicely adjusted by the screws 13 and 14, as described.

The lens-carriage consists of a base-plate 21, which extends across the bed, 1 and is provided with removable flanges $21^a$, which overlap the edges of the bed, and one of which connects with the feed-screw 7 and carries a pinion $8^a$, engaging the rack 8, by which the position of the carriage may be adjusted, and a frame 22, mounted upon the base-plate having a horizontal portion $22^a$ above and parallel with the base-plate, and two parallel upwardly-extending arms or supports $22^b$ in line with the bed-plate 1, said arms being provided with suitable boxes 23, in which turns the hollow shaft 24. The shaft 24 is made hollow to enable a person to look through the lens and through the shaft that he may the better observe the progress of the work. The shaft 24 is suitably secured in the boxes 23, is provided with a suitable driving-pulley $24^a$, with a collar $24^b$ near one end thereof, and with a screw-threaded portion $24^c$, upon which a holdfast 25 may be screwed. The holdfast 25 is a little smaller than the lens 26, which is connected thereto, is provided with a central threaded hole to receive the shaft 24, with a smooth back which fits closely against the collar $24^b$, and with a projecting lug $25^a$, with which engages the bolt $25^b$, which projects through an opposite lug 27, which is pivoted to the collar $24^b$, and by means of which the position of the holdfast may be nicely adjusted. The lugs $25^a$ and 27 are placed at an angle to each other, and as the lug 27 and the collar $24^b$, to which it is attached, are rigid when the bolt $25^b$ is turned it moves the lug $25^a$ and the holdfast 25, to which it is attached, to the right or left, as the case may be.

Longitudinally opposite the base-plate 21 is another plate 28, which extends across the bed 1, having suitable flanges $28^a$ to overlap the edges of the bed and hold the plate in position thereon, and having upon its upper side a guide-strip 29, which is suitably supported thereon, so as to extend across the plate and afford room for the end of the radial bar, as described below. Said plate is also attached to the bed 1 by bolts 30, which extend downwardly through the plate and into the slots 6 of the bed.

Mounted loosely upon the plate 28, so that it may slide thereon, is a vertical frame 31, having a slot $31^a$ upon its under side to receive the radius-bar 36, a horizontal recess $31^b$, which affords room to manipulate the nut on the bolt 32, by which the frame is attached to the radius-bar 36, and arms $31^c$, extending diagonally upward and which carry suitable boxes to support the shaft 33. One of the arms $31^c$ is longer than the other, so that the shaft 33 will lie in a diagonal position. Fixed to the shaft 33 is an emery-wheel 34 or other suitable grinder, and a pulley 35, by which the shaft and emery-wheel are revolved.

The tops of the plates 28 and 21 and the top of bolt 18 should all be on about the same horizontal plane, so that the radius-bar 36 may be nearly level and the center of the bolt 18 and of the lens 26 when fixed to the holdfast 25 should be in about the same vertical line, as hereinafter explained. The radius-bar 36 is of about the same length as the bed 1, and is of an even width and thickness throughout. It fits closely between the upwardly-extending sides $17^a$ of the holder, being fixed in a definite position therein by the set-screws 37 in the sides of the holder, is provided with a hole $36^a$, through which passes the bolt by which it is attached to the movable frame 31, and fitted upon the bar so as to slide thereon is a block 38, which is positioned by the set-screw 39, and is of a size to just fit between the plate 28 and guide-strip 29 and steady the said bar. It will thus be seen that the emery-wheel 34 will bear against the lens 26, and that as the grinder-frame moves upon the plate 28 it will have a true arc of oscillation, as the radius-bar to which it is connected cannot vary. Consequently the lens will be ground perfectly true. The manner of oscillating the grinder-frame will be hereinafter described.

Figure 3:
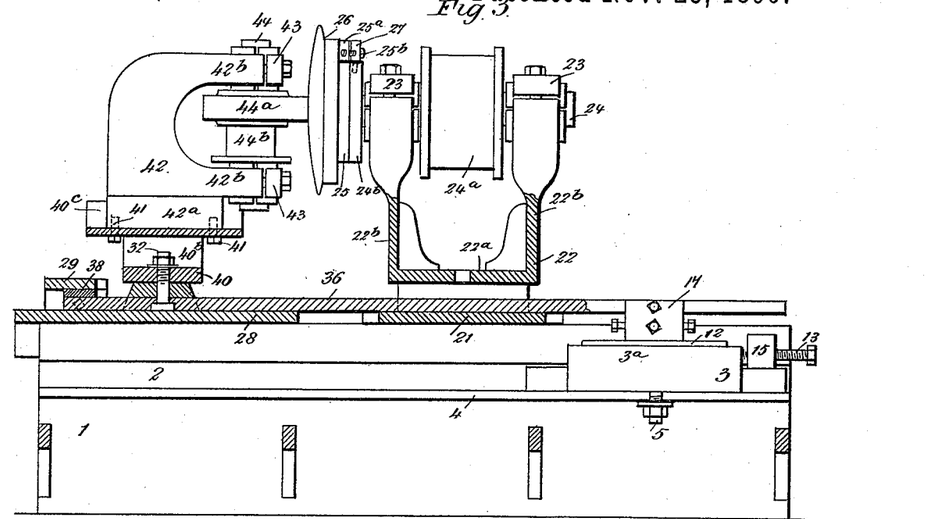
Fig. 3 is a vertical longitudinal section showing a finer grinder arranged at right angles with the lens and mounted upon an oscillating frame.

After roughing out the shape of the lens by the emery-wheel 34 the frame 31 may be removed and a frame 40 substituted. The frame 40 has a flat base, which rests upon and is movable on the plate 28, a slot which fits upon the radius-bar 36, a recess $40^b$ to enable it to be bolted to the bar, like frame 31, already described, and an upper case $40^c$, having inwardly-tapering sides, and through the sides and bottom of the case $40^c$ project set screws 41, by which the frame contained in said case may be adjusted, as described below.

Figures 4, 5:
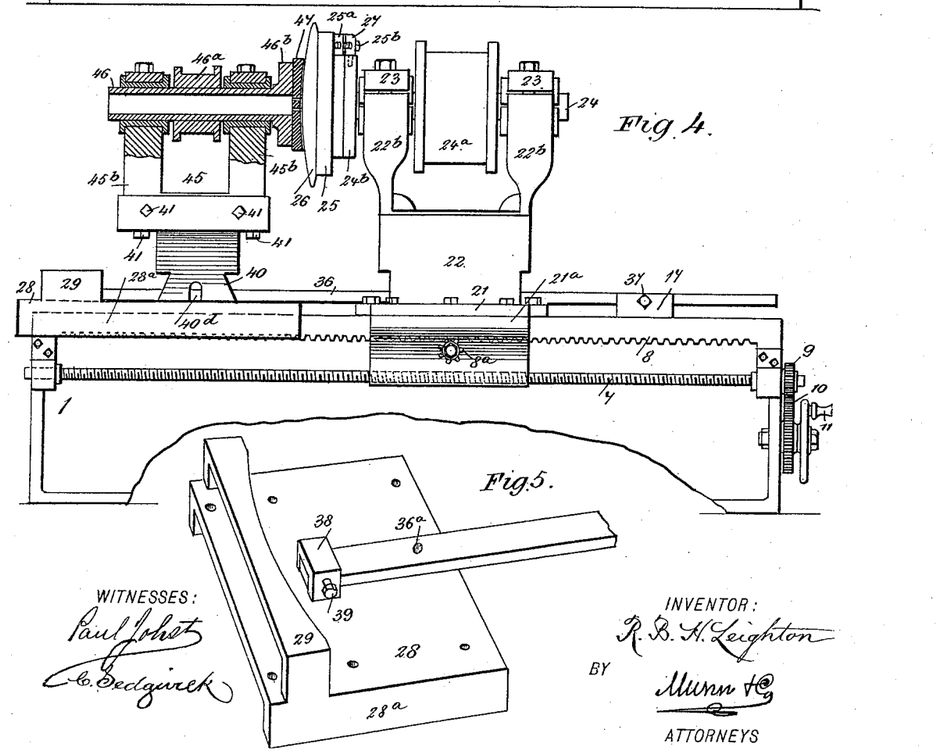
Fig. 4 is a detail side elevation showing the lens in connection with a finishing-lap, said lap being mounted upon an oscillating carriage, and the lap, lap-shaft, and bearings being in vertical section.
Fig. 5, a detail view of the bed-plate and of the radial bar that regulates the arc of oscillation of the grinder and the focus of the lens.

The frame 42 is mounted in the case $40^c$, said frame having a base $42^a$, which fits in the case $40^c$, and having two forwardly-extending arms $42^b$ in vertical alignment, which are provided with boxes 43, in which turns the vertical shaft 44. The shaft 44 is provided with an emery-wheel $44^a$, which is fixed thereto, and is finer than the wheel 34, and with a suitable driving-pulley $44^b$, to which power is applied to rotate the shaft and emery-wheel. By having the emery-wheel $44^a$ mounted upon a vertical shaft it will bear upon the lens 26 at a different angle from the wheel 34, and will remove any scratches that the coarser wheel may have left in the glass. To finish smoothing the lens, the frame 42 is removed from the case $40^c$ and the frame 45 inserted. The frame 45 has a wide base $45^a$, which fits between the tapering sides of the case $40^c$, and two vertical arms $45^b$, carrying suitable boxes in which turns the hollow shaft 46. The shaft 46 has a driving-pulley $46^a$ affixed thereto, by which it may be rotated, and has at the end next the lens a collar $46^b$, to which is attached the finishing-lap 47. The lap 47 is shaped to fit nicely upon the lens 26, is provided with intersecting grooves $47^a$ upon its face, and with perforations $47^b$, which communicate with the hollow shaft 46, so that the shaft may be filled with liquid charged with emery or other sharp substance, and the liquid will flow through the perforations and be diffused over the face of the lap by means of the grooves $47^a$, thus enabling the lap to rapidly polish the lens.

The frame 45 may be tilted in any direction, so as to bring the lap 47 firmly and squarely upon the lens, by means of the set-screws 41, which project through the sides of the case $40^c$ and impinge upon the base of the frame. By loosening the set-screws upon one side of the case and tightening them upon the other, and by raising or lowering the set-screws in the bottom of the case, the frame contained therein may be tilted and held in any desired position.

Figures 6, 8:
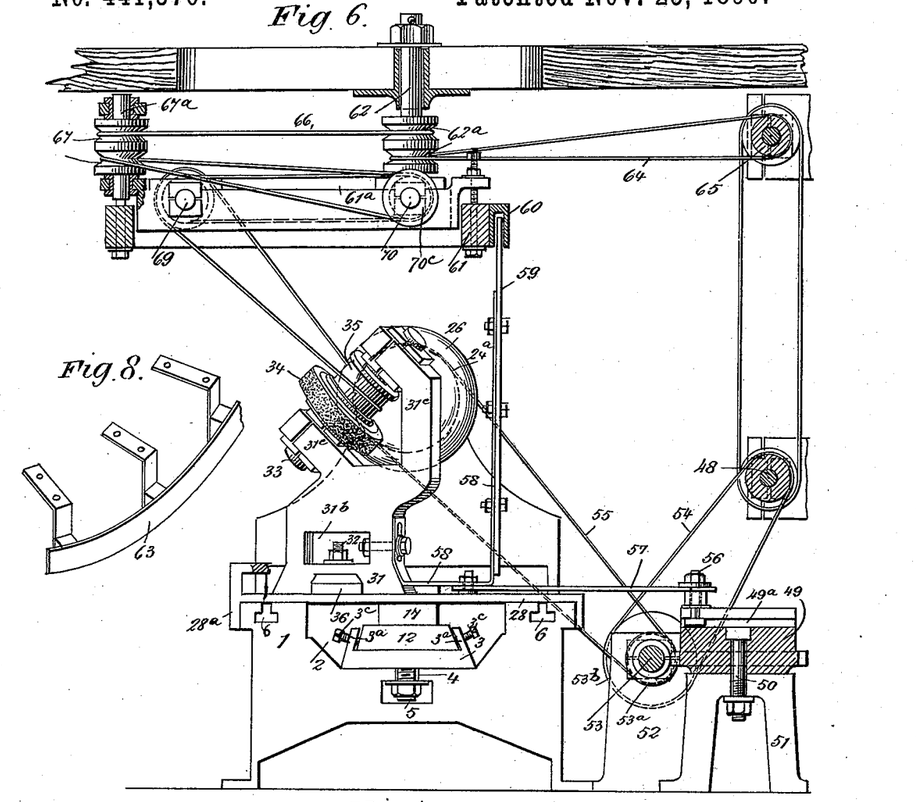
Fig. 6, an end view of the machine, and also showing the driving mechanism therefor partly in section.
Fig. 8, a broken perspective view of the suspending-frame of the upper driving mechanism.
Figure 7:
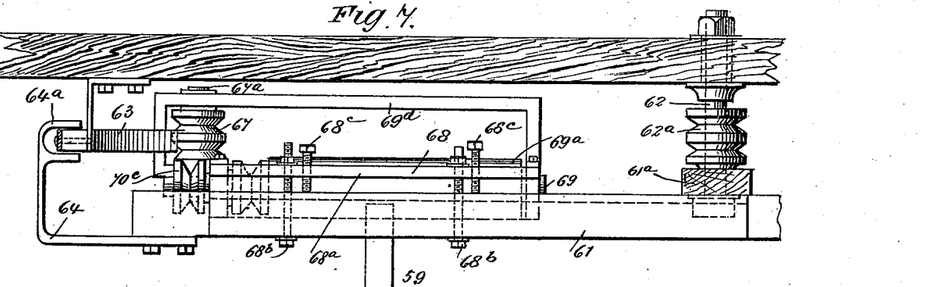
Fig. 7, an enlarged front elevation of the upper portion of the driving mechanism.
Figures 9, 10, 11:
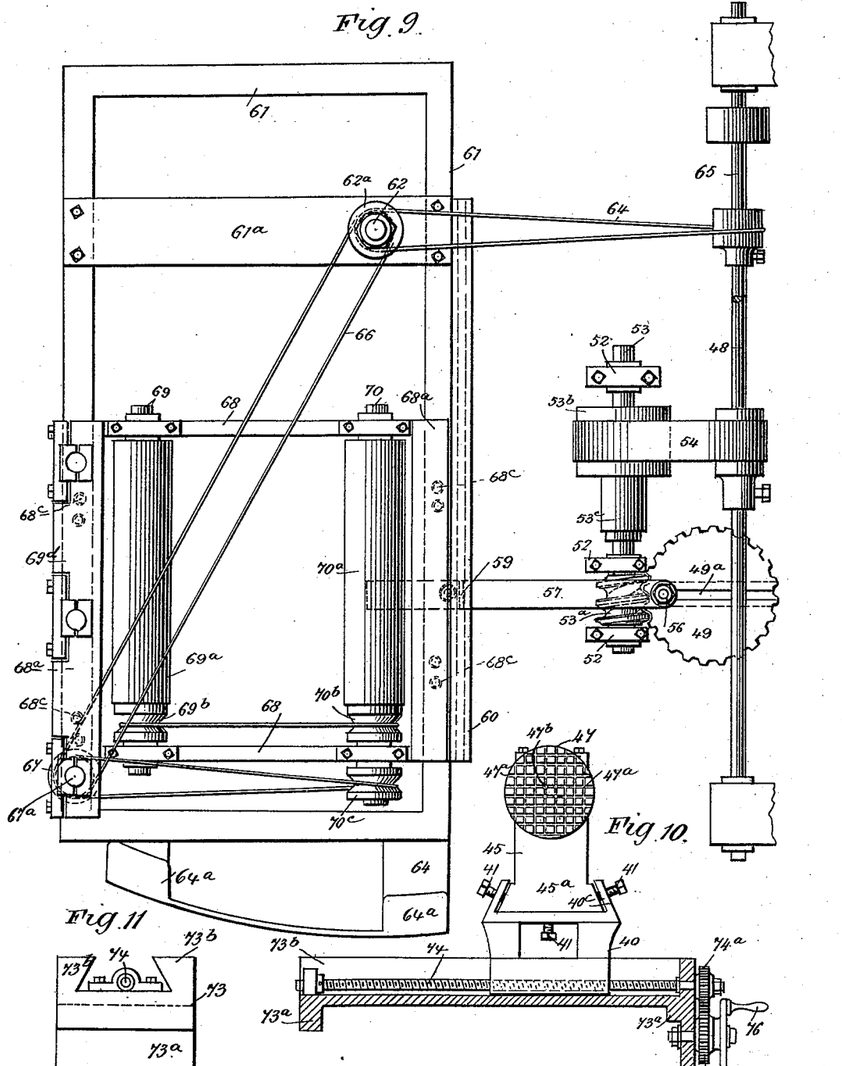
Fig. 9, a plan of the driving mechanism.
Fig. 10, a modified form of carriage with a finishing-tool in position therein.
Fig. 11, an end view of said carriage.

The lens and grinders are rotated and the grinding-carriages oscillated by means of the following-described mechanism: The power is taken from a main shaft 48, which is suitably mounted at right angles with the machine. Below the shaft and near the bed 1 is a gear-wheel 49, mounted upon the vertical shaft 50, which turns in the frame 51, which rests upon the floor. Mounted in suitable supports 52 adjacent to said gear-wheel is a shaft 53, having a pulley $53^b$, connecting by a belt 54 with a pulley of the main shaft, a worm $53^a$, which meshes with the gear-wheel 49, so as to slowly turn the same, and a pulley $53^c$, which connects by a belt 55 with the pulley $24^a$ of the shaft 24 and turns the lens, as shown in Fig. 6. As will be hereinafter described, sometimes the lens-carriage is stationary and the grinding mechanism oscillates, and sometimes these conditions are reversed and the belt 55 is connected with the shaft of the part that is stationary. In the upper face of the gear-wheel 49 is a diametrical slot $49^a$, extending across the same, and in which a bolt 56 is fixed to attach the connecting-rod 57 to the gear-wheel. The connecting-rod 57 is pivoted at one end to the bolt 56 and at the other to the bar 58, one end of which is attached to the frame 31 or 40, as the case may be, and the other end of which extends upwardly and is connected by means of the guide-bar 59 with the slotted guide 60 of the rectangular frame 61. The frame 61 is suspended in a horizontal position above the grinding-machine and in line therewith by the shaft 62, which extends from the ceiling through a cross-bar $61^a$ of the frame, and to which shaft the frame is pivoted, and by the curved suspending-frame 63, which is bolted to the ceiling or other support, and upon which fit the arms 64, which are suitably attached to the frame 61 and have bifurcated ends $64^a$ to slide upon the frame 63. The frame 61 may thus turn upon the shaft 62 and oscillate in unison with the parts below. The shaft 62 is provided with grooved pulleys $62^a$, one of which connects by a belt 64 with a pulley upon the counter-shaft 65, said counter-shaft being suitably connected with the main shaft 48 below, and the other of which connects by a belt 66 with one of the pulleys 67, which are fixed to the vertical shaft $67^a$ of the frame 68, so that practically the pulleys 67 and 62 will be in opposite corners of the frame 61. The shaft $67^a$ is supported by a frame-work $69^d$, attached to the upper side of the frame 68, and which may be provided with several similar shafts and pulleys mounted in suitable boxes, as shown, and which may be used, if desired. The frame 68 is shorter than the frame 61, in which it may be moved longitudinally by loosening the bolts by which it is attached thereto. It is provided with flanges $68^a$, which support it upon the frame 61, with bolts $68^b$, by which it may be attached to the frame 61, and with set-screws $68^c$, which project through the frame and impinge upon the frame 61, by which the frame 68 may be raised from the frame 61. This will be necessary sometimes to tighten the belts which extend from the pulleys of the frame 68 to the mechanism below, as the belts are whole belts, it being impracticable to use laced belts in lens-grinding, as the operation is one of such nicety, and the lacings cause a jar as they pass over the pulleys. Extending longitudinally across the frame 68 are the shafts 69 and 70, having fixed thereto or formed thereon the drum-pulleys $69^a$ and $70^a$, which extend nearly the length of the frame 68, and at one end of each of which is a grooved pulley $69^b$ and $70^b$, which are connected by a suitable belt, by which power is transmitted from one shaft to the other. The shaft 70 projects through one end of the frame 68, and is provided on said projecting end with a grooved pulley $70^c$, by which the shaft 70 is driven, said pulley being connected by a suitable belt with one of the pulleys 67 on the vertical shaft $67^a$. The drum-pulleys may be severally connected with the traveling mechanism below to revolve an emery-wheel or grinder, as the case may be, and the drum-pulleys being long, as shown, will allow the belt which passes over them to move longitudinally thereon to conform to the change in distance between a certain point of the pulley and the mechanism below, caused by the oscillation of said mechanism and of the frames 61 and 68.

As the frame 61 is connected by the guide-bar 59 with the oscillating mechanism below, it will be seen that there will be several movements going on at the same time. Consequently the work will be done very rapidly. The lens will be revolved in one direction, the grinding-wheels in an opposite direction, and as the grinding-frame will oscillate in a true arc, as determined by the radius-bar 36, every part of the lens will be evenly and perfectly ground.

Figure 12:
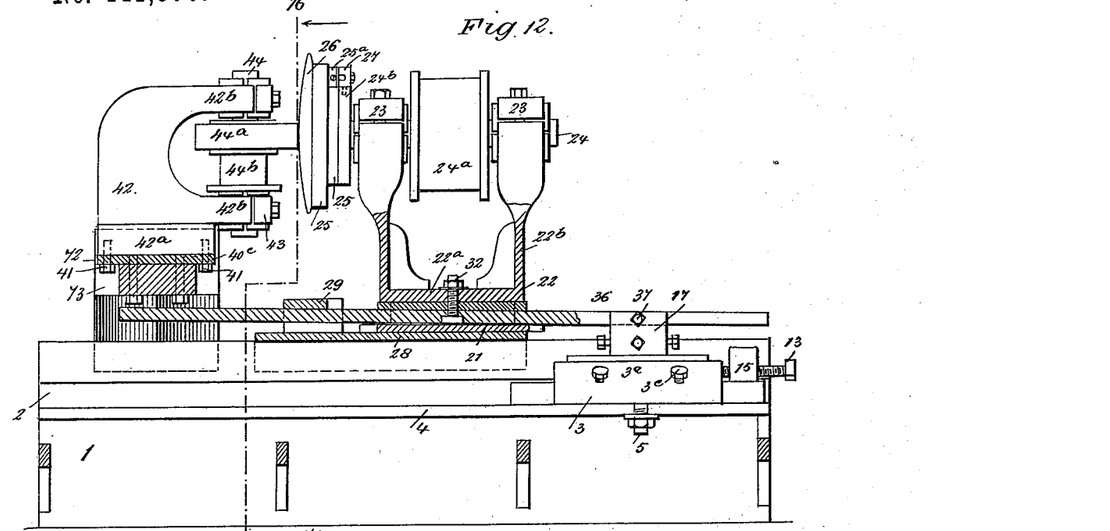
Fig. 12, a vertical longitudinal section showing the grinder-carriage stationary and the lens-carriage movable.
Figure 13:
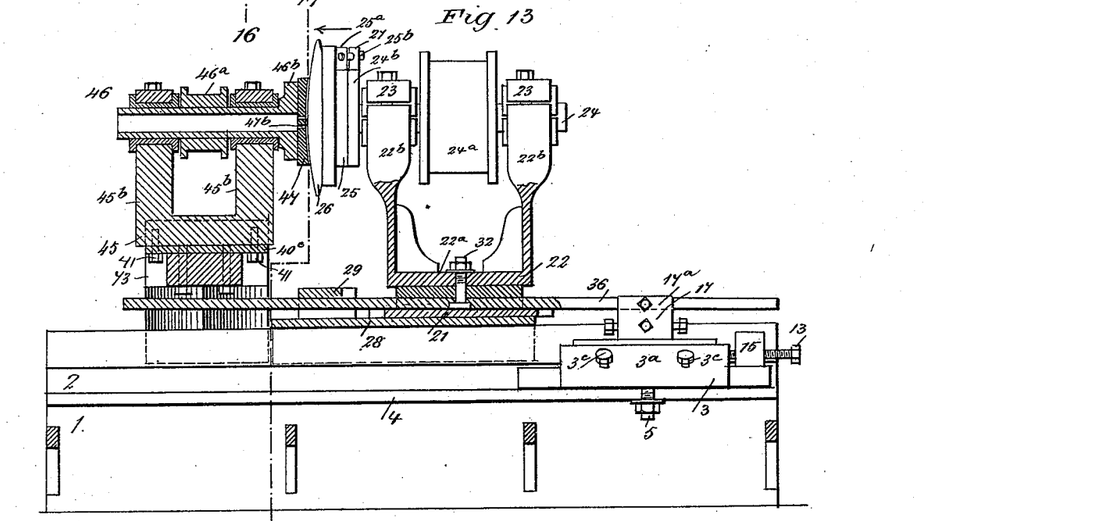
Fig. 13, a vertical longitudinal section showing a stationary finishing-tool carriage and a movable lens-carriage.
Figure 14:
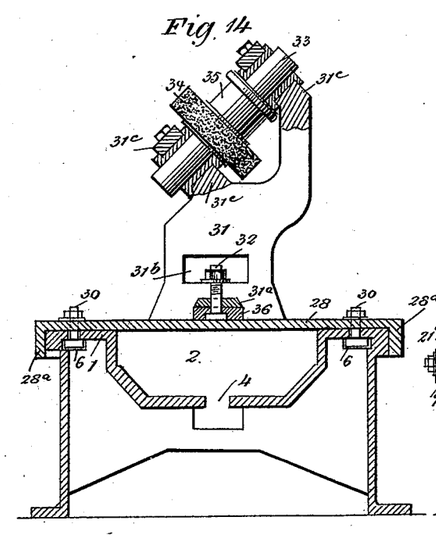
Fig. 14, a vertical cross-section on the line 14 14 of Fig. 1, looking in the direction of the arrow.
Figure 15:
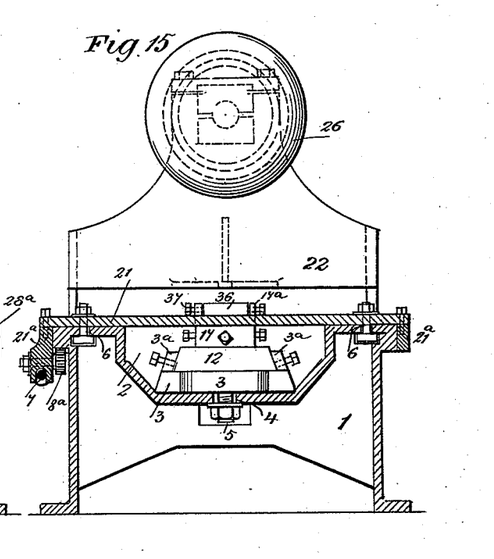
Fig. 15, a vertical cross-section on the line 15 15 of Fig. 1, looking in the direction of the arrow.
Figures 20, 21, 22:
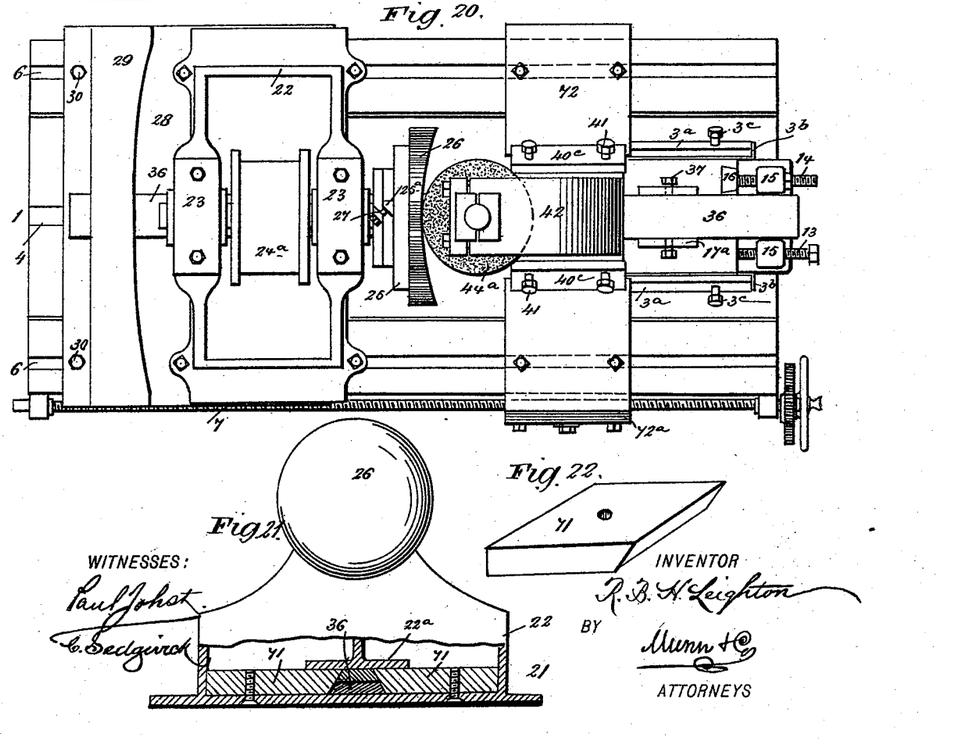

In Figs. 12 and 13 I have shown another method of grinding a convex lens, in which the grinding-frames are stationary and the lens-carriage is oscillated, the details of this construction being more fully shown in Figs. 21 and 22. In this case the plate 28 is moved nearer the slide 3, the flanges $21^a$ are removed from the base-plate 21, and the plate 21 mounted upon the plate 28. The radius-bar 36 is bolted to the frame 22 or the plate 21, and is held in position by the blocks 71, which fit closely upon the radius-bar, extend to the sides of the frame 22, and are bolted or screwed to the plate 21. The block 38 is moved upon the radius-bar, so as to move between the guide-strip 29 and the plate 28, and the gear-wheel 49 and the mechanism for driving the same are placed in line with the lens-carriage and attached thereto and connected with the frame 61 above in the same manner that said mechanism was connected with the frames 31 or 40, as described. When the lens-carriage is oscillated, a stand 72 is fixed to the bed 1 opposite the lens-carriage, and the frames carrying the grinding-tools severally mounted thereon. The stand 72 is provided with side pieces $72^a$, which raise it from the bed 1 and allow the end of the radius-bar 36 to swing beneath it and upon the top with a suitable tapering case or slide, as $40^c$, to receive and hold a base of the frame 42 or 45. To grind the lens the frame 42, with the grinding mechanism already described, is fastened in the slide $40^c$ and the driving-pulley thereof connected with the shaft 53. The frame 68 is moved in the frame 61, so as to be above the lens-carriage, and one of the drum-pulleys thereof is connected with shaft of the lens-carriage. The lens-carriage will then be oscillated and also guided by the radius-bar 36, so that a true lens will be formed. To polish the lens the frame 42 is removed from the slide $40^c$, and the frame 45, carrying the finishing-lap 47, is inserted, and this mechanism will operate as already described, except that the lens will oscillate and the grinding-frame will be stationary. Instead of mounting the frame 45 in the slide $40^c$, the stand 72 may be removed, the stand 73 fixed in its place, and the frame 40, carrying frame 45, mounted therein. The stand 73 has flanges $73^a$ to hold it in position upon the bed 1, although it is also bolted thereto, has inwardly-tapering sides $73^b$ to hold a frame in place therein, and is provided with a feed-screw 74, which is suitably mounted therein, said screw extending longitudinally across the stand 73 and having at one end a pinion $74^a$, connecting with a gear-wheel 75 and handle 76, by which it may be operated. The frame 40 has a slot $40^d$ extending across the bottom thereof, the upper portion of said slot being screw-threaded to fit the screw 74. When the frame 40 is placed in the stand 73, the slot $40^d$ is placed upon the screw 74, and by turning the screw the position of the frame may be very nicely adjusted. The slot $40^d$ is screw-threaded on the upper side only, and the weight of the frame 40 causes the screw-thread to be engaged by the screw 74.

Figure 19:
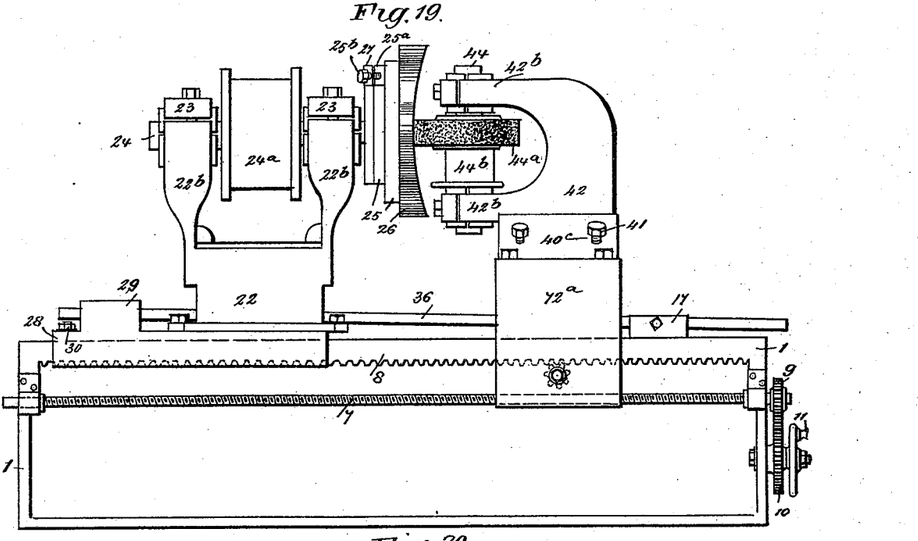
Fig. 19, a side elevation of the lens-carriage and grinder as arranged for grinding a concave lens.

In Figs. 19 and 20 I have shown the machine as arranged to grind a concave lens. In this case the lens-carriage is nearer the free end of the radius-bar 36 and the grinding mechanism placed nearer the slide 3. As shown in the drawings, the lens-carriage is attached to the radius-bar and is to be oscillated; but either part may be oscillated in the same manner as when a convex lens is to be formed.

By placing the grinding mechanism between the lens-carriage and the slide 3 it is obvious that a concave surface will be formed on the lens, as the lens will represent a longer arc of oscillation than the grinding-tool, and the degree of concavity is regulated by changing the length of the radius-bar in the manner already described.

In operating the machine power is applied by means of the various belts, as already described, the gear-wheel 49 as it revolves will oscillate the carriage or frame with which it is connected by the rods 57 and 58, the guide-bar 59 will cause the overhead frames to move in unison with the lower parts, the radius-bar 36 will hold the movable carriage in such a manner that it will describe a true arc, and as a result the lens must be perfectly ground.

A more detailed description of the manner in which the machine is operated will not be necessary, as the operation of the various parts has been set forth in the description. I do not confine myself to the precise construction of parts set forth in this specification, as the various frames and carriages might be greatly changed without departing from the principle of my invention. It is obvious, too, that the bed 1 and the horizontal frames 61 and 68 might be placed in a vertical position and the various carriages attached in the bed.

Having thus described my invention, I claim as new and desire to secure by Letters Patent—

1. The combination, in a lens-grinding machine with a bed and a fixed carriage carrying a lens, of a radius-bar pivoted on the bed, and a second carriage movable on the bed and carrying a grinding-tool, said second carriage being secured to the radius-bar, substantially as described.

2. In a lens-grinding machine, the combination, with a bed, of a fixed and a circularly-reciprocating carriage, one of said carriages carrying a hollow revoluble shaft with a lens-holder secured to one end thereof and the other carrying a revoluble shaft with a grinding-tool secured thereto, and means for holding the reciprocating carriage in a fixed arc, substantially as described.

3. A lens-grinding machine having a stationary carriage carrying a rotatable shaft provided with a holdfast, to which the lens may be attached, and an oscillating carriage in line with said stationary carriage having a rotatable grinding-wheel mounted therein, which may be brought against the face of the lens, substantially as described.

4. A lens-grinding machine consisting, essentially, of a bed-plate, a stationary carriage mounted thereon, having a shaft mounted therein, an oscillating frame or carriage in line with said stationary carriage having a shaft mounted therein, one of said shafts carrying a holdfast and the other a grinding-wheel, and a bar pivoted in line with said carriages and attached to the oscillating frame or carriage to determine its arc of oscillation, substantially as described.

5. A lens-grinding machine consisting, essentially, of a bed-plate having a longitudinal recess therein, a slide movable in said recess and having a bar-holder pivoted thereon, a carriage mounted upon the bed-plate, having a rotable horizontal shaft provided with a holdfast to which the lens may be attached, a second carriage mounted upon the bed-plate in line with said lens-carriage having a rotatable grinding-wheel which may be brought in contact with the lens, means, as shown, for oscillating one of said carriages, and a bar connecting the oscillating carriage with the bar-holder of the slide, so as to determine the arc of oscillation of said carriage, substantially as described.

6. A lens-grinding machine consisting, essentially, of a bed-plate having a longitudinal recess therein, a slide movable in said recess and having a bar-holder pivoted thereon, a carriage mounted upon the bed-plate, having a rotatable horizontal shaft provided with a holdfast to which the lens may be attached, a second carriage mounted upon the bed-plate in line with said lens-carriage, having a rotatable grinding-wheel which may be brought in contact with the lens, means, as shown, for oscillating one of said carriages, a bar connecting the oscillating carriage with the bar-holder of the slide, so as to determine the arc of oscillation of said carriage, and means for adjusting the bar-holder, substantially as described.

7. A lens-grinding machine consisting, essentially, of a bed-plate having a longitudinal recess therein, a slide movable in said recess and having a pivoted bar-holder thereon, a carriage mounted upon said bed-plate, having a rotatable shaft with a holdfast fixed thereto to which a lens may be attached, a carriage mounted upon the bed-plate in line with said lens-carriage, having a rotatable grinding-wheel mounted therein which may be brought against the lens, means, as shown, for oscillating one of said carriages, a bar connecting the oscillating carriage with the pivoted bar-holder, and a frame mounted above said carriages and arranged to oscillate in unison therewith, said frame having revolving pulleys therein, which may be connected with the shaft of the oscillating carriage, substantially as described.

8. In a lens-grinding machine, the slide 3, having tapering sides $3^a$, provided with adjustable slides $3^b$, the plate 12, movable between said sides, the bar-holder 17, having upwardly-extending sides $17^a$, the bolt 18, having flange $18^a$ and tapering portion $18^b$ for attaching the holder to the plate 12, the abutments 19 to fit the part $18^b$, and means, as screws 13 14, posts 15, and nut 16, for moving the plate 12 and holder 17, substantially as described.

9. The combination, with the bar 36, fixed to the bar-holder 17 and to an oscillating frame of the machine, as shown, of the plate 28, having guide-strip 29, and movable block 38 for steadying the bar, substantially as described.

10. The combination, with the slide 3, having sliding plate 12 and bar-holder 17 pivoted thereon, of the bar 36, having means, as shown, for attaching it to an oscillating carriage or frame, and means, as screws 13 and 14, post 15, and nut 16, for adjusting said bar, substantially as described.

11. The combination, with an oscillating frame or carriage of a lens-grinding machine, having a rotatable shaft therein, of the frame 61, pivoted above said carriage, means, as guide-bar 59, guide-strip 60, connecting-rods 57 58, and gear-wheel 49, for moving said frame in unison with said carriage, the frame 68, adjustably mounted in the frame 61 and provided with the vertical shaft $67^a$, carrying pulleys 67, the horizontal drum-pulleys $69^a$ and $70^a$, grooved pulleys $69^b$, $70^a$, and $70^b$, and suitable belts for operating said pulleys and for connecting the drum-pulleys with the oscillating carriage, substantially as described.

12. The combination, with the frame 61, pivoted above the grinding mechanism, as shown, of the frame 68, mounted in the frame 61, having revolving pulleys mounted therein, connecting with the grinding mechanism, and means, as set-screws $68^c$, for raising the frame 68 and tightening the connecting-belts, substantially as described.

13. The combination, with a frame having a suitable grinding-wheel mounted therein, and having a widened base, as shown, of the case $40^c$, mounted upon a suitable stand and having set-screws 41 projecting through the same and impinging upon the base of said grinding-frame and adapted to regulate the position thereof, substantially as described.

14. The combination, with the stand 73, having flanges $73^a$ and tapering sides $73^b$, and the screws 74, mounted in said stand and having means, as pinion $74^a$, gear-wheel 75, and handle 76, for actuating the same, of the frame 40, having a slot $40^d$, provided with a thread to fit the screw 74, the case $40^c$, fixed to said frame, and the grinding-frame 45, mounted in said case and provided with a rotatable grinding-wheel, substantially as described.

RICHARD B. H. LEIGHTON.

Witnesses:
WARREN B. HUTCHINSON,
C. SEDGWICK.